US010983008B2

(12) United States Patent
Mitchell et al.

(10) Patent No.: US 10,983,008 B2
(45) Date of Patent: Apr. 20, 2021

(54) BOLOMETER PIXEL INCLUDING THERMAL-SENSITIVE FILM TRIGGER

(71) Applicant: RAYTHEON COMPANY, Waltham, MA (US)

(72) Inventors: Jeffrey Mitchell, Santa Barbara, CA (US); Ryan P. Boesch, Louisville, CO (US); Matthew C. Thomas, Carpinteria, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/438,847

(22) Filed: Jun. 12, 2019

(65) Prior Publication Data

US 2020/0393301 A1   Dec. 17, 2020

(51) Int. Cl.
| | |
|---|---|
| *G01J 5/46* | (2006.01) |
| *G01J 5/04* | (2006.01) |
| *H04N 5/33* | (2006.01) |
| *G01J 5/12* | (2006.01) |
| *G01J 5/00* | (2006.01) |

(52) U.S. Cl.
CPC .............. *G01J 5/046* (2013.01); *H04N 5/33* (2013.01); *G01J 5/12* (2013.01); *G01J 2005/0077* (2013.01)

(58) Field of Classification Search
CPC ...... G01J 5/046; G01J 5/12; G01J 2005/0077; H04N 5/33
See application file for complete search history.

(56) References Cited

U.S. PATENT DOCUMENTS

| | | | |
|---|---|---|---|
| 6,222,585 B1 | 4/2001 | Endoh | |
| 6,437,331 B1* | 8/2002 | Kawano | G01J 5/20 250/332 |
| 6,441,368 B1* | 8/2002 | Grinberg | G01J 5/08 250/216 |
| 10,175,113 B2 | 1/2019 | Masini et al. | |
| 2011/0233404 A1 | 9/2011 | Sonstroem | |
| 2011/0266445 A1 | 11/2011 | Beratan | |
| 2012/0132804 A1* | 5/2012 | Lee | H01L 27/14609 250/330 |
| 2015/0192473 A1 | 7/2015 | Pelenc et al. | |

FOREIGN PATENT DOCUMENTS

WO   2007015235 A1   2/2007

OTHER PUBLICATIONS

Fukaya "Analysis of 320X240 Uncooled Microbolometer Focal Plane Array and Design of Thermoelectric Cooler Controller", New Jersey Institute of Technology, May 1997, p. 1-55. (Year: 1997).*
International Search Report and Written Opinion issued in International Application No. PCT/US2020/037132; Application Filing Date Jun. 11, 2020; dated Oct. 9, 2020 (14 pages).

* cited by examiner

*Primary Examiner* — David P Porta
*Assistant Examiner* — Mamadou Faye
(74) *Attorney, Agent, or Firm* — Cantor Colburn LLP

(57) ABSTRACT

A bolometer pixel trigger including a substrate, a bolometer formed on the substrate, and a thermal-sensitive film trigger. The thermal-sensitive film trigger includes a resistive varying thermal-sensitive material configured to change resistance in response to a change in temperature thereof. The thermal-sensitive film trigger is configured such that current flow therethrough varies in response to changes in the resistance of the resistive varying thermal-sensitive material.

17 Claims, 5 Drawing Sheets

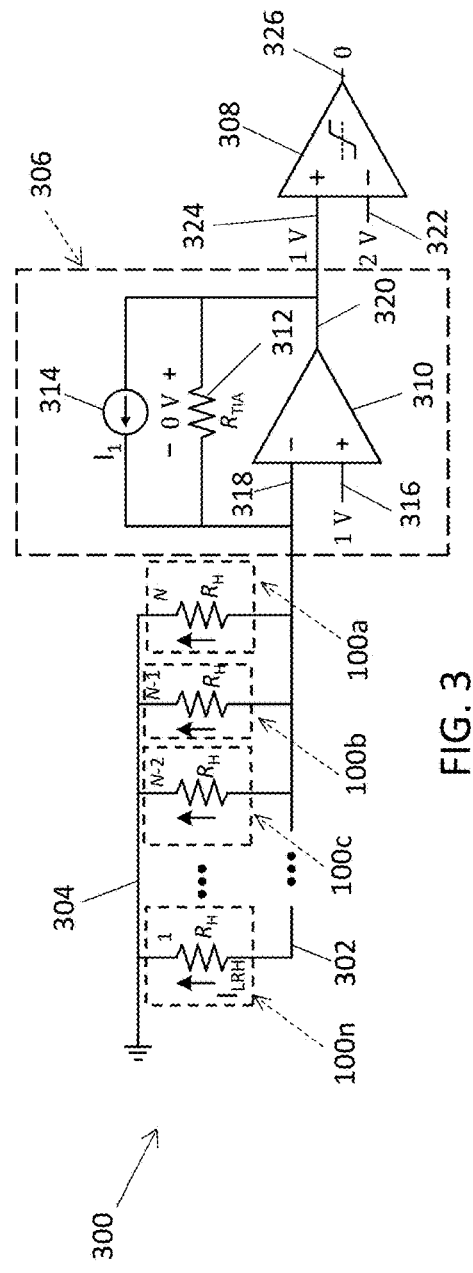
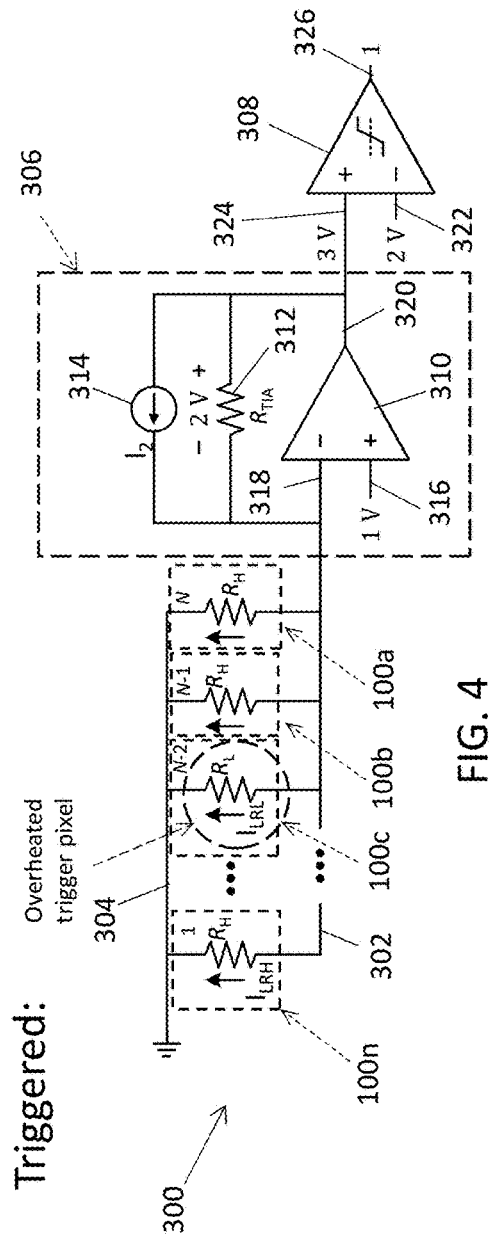

BOLOMETER PIXEL INCLUDING THERMAL-SENSITIVE FILM TRIGGER

BACKGROUND

The present teachings are generally related to thermal imaging systems, and more particularly, to bolometer pixels included in thermal imaging systems.

Bolometer pixels are used in a wide variety of infrared or thermal imaging applications. When they are exposed to heat sources bolometer pixels change their resistance to provide a measureable signal. However, bolometer pixels are vulnerable to excessive heat sources which can fundamentally change the mechanical properties and response of the pixel and degrade their resulting imaging capability. In addition, extreme heat sources can completely destroy the pixels.

SUMMARY

Embodiments of the present invention are directed to a bolometer pixel trigger including a substrate, a bolometer formed on the substrate, and a thermal-sensitive film trigger. The thermal-sensitive film trigger includes a resistive varying thermal-sensitive material configured to change resistance in response to a change in temperature thereof. The thermal-sensitive film trigger is configured such that current flow therethrough varies in response to changes in the resistance of the resistive varying thermal-sensitive material.

Embodiments of the present invention are directed to a trigger sense circuit comprising a current source configured to generate a trim current and a plurality of bolometer pixel triggers. Each bolometer pixel trigger includes a film thermal-sensitive film trigger configured to selectively operate in a normal state and a triggered state based on a temperature of the thermal-sensitive film trigger such that flow of the current therethrough varies. The trigger sense circuit further comprises an overheating condition detector circuit in signal communication with the plurality of bolometer pixel triggers. The overheating condition detector circuit is configured to detect at least one overheated bolometer pixel trigger among the plurality of bolometer pixel triggers in response a level of the current.

Embodiments of the invention are directed to a method of detecting excessive thermal energy delivered to a bolometer pixel trigger, the method comprising delivering electrical current having a first current level to a plurality of bolometer pixel triggers, wherein each bolometer includes a thermal-sensitive film trigger through which the electrical current flows. The method further comprises flowing the electrical current at a second current level through at least one of the bolometer pixel triggers in response to an increase in temperature of the at least one thermal-sensitive film trigger of at least one of the bolometer pixel triggers. The method further comprises detecting at least one overheated bolometer pixel trigger among the plurality of bolometer pixel triggers in response to detecting delivery of the second current level.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE SEVERAL VIEWS OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 is a schematic diagram of a readout integrated circuit (ROIC) used in conjunction with thermal-sensitive film trigger and including a trigger sense circuit operating in an armed state according to a non-limiting embodiment;

FIG. 4 is a schematic diagram of the ROIC shown in FIG. 3 including the trigger sense circuit operating in a triggered state according to a non-limiting embodiment;

Figure 1:
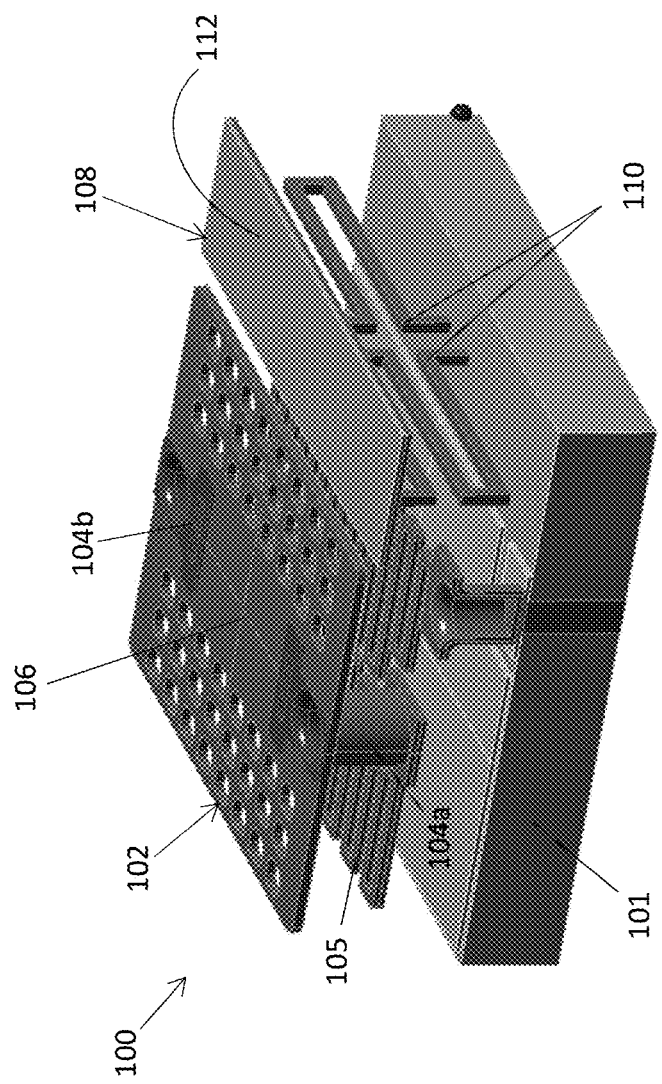
FIG. 1 is a perspective view of a bolometer pixel including a thermal-sensitive film trigger according to a non-limiting embodiment.

The diagrams depicted herein are illustrative. There can be many variations to the diagrams or the operations described therein without departing from the spirit of the invention. For instance, the actions may be performed in a differing order or actions may be added, deleted or modified.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections or positional relationships, unless otherwise specified, can be direct or indirect, and the present invention is not intended to be limited in this respect. Moreover, the various tasks and process operations described herein can be incorporated into a more comprehensive procedure or process having additional steps or functionality not described in detail herein, or one or more tasks or operations may be optional without departing from the scope of the invention.

The following definitions and abbreviations are to be used for the interpretation of the claims and the specification. As used herein, the terms "comprises," "comprising," "includes," "including," "has," "having," "contains," or "containing," or another variation thereof, are intended to cover a non-exclusive inclusion. For example, a composition, mixture, process, method, article, or apparatus that comprises a list of elements is not necessarily limited to only those elements but can include other elements not expressly listed or inherent to such composition, mixture, process, method, article, or apparatus.

Additionally, the terms "at least one" and "one or more" may be understood to include a number greater than or equal to one (e.g., one, two, three, four, etc.). The term "a plurality" may be understood to include a number greater than or equal to two (e.g., two, three, four, five, etc.). The terms "about," "substantially," or "approximately," or variations thereof, are intended to include a degree of error associated with measurement of the particular quantity based upon the equipment available.

For the sake of brevity, conventional techniques related to making and using aspects of the invention may or may not be described in detail herein. In particular, various aspects of computing systems to implement the various technical features described herein may be well known. Accordingly, in the interest of brevity, some conventional implementation details are only mentioned briefly herein or are omitted entirely without providing the well-known system or process details.

Turning now to an overview of technologies that are more specifically relevant to aspects of the invention, thermal shorts, thermal shutters and thermochromic switches have been modeled and employed in thermal imaging system to protect bolometer pixels from damage caused by excessive heat. However, the aforementioned conventional protection methods have limitations in terms of how much heat can be conducted away from pixels (via a thermal short) when exposed to lasers or solar radiation or how much laser or solar radiation can be blocked from reaching the pixels by the shutter and thermochromic switch (phase change $VO_x$). Furthermore the thermal short, thermal shutter and thermochromic switch all impart reductions on the normal bolometer performance (when not exposed to laser or solar radiation) due to either reduced fill factor or reduced transmission of infrared light to the bolometer pixels.

Figure 2:
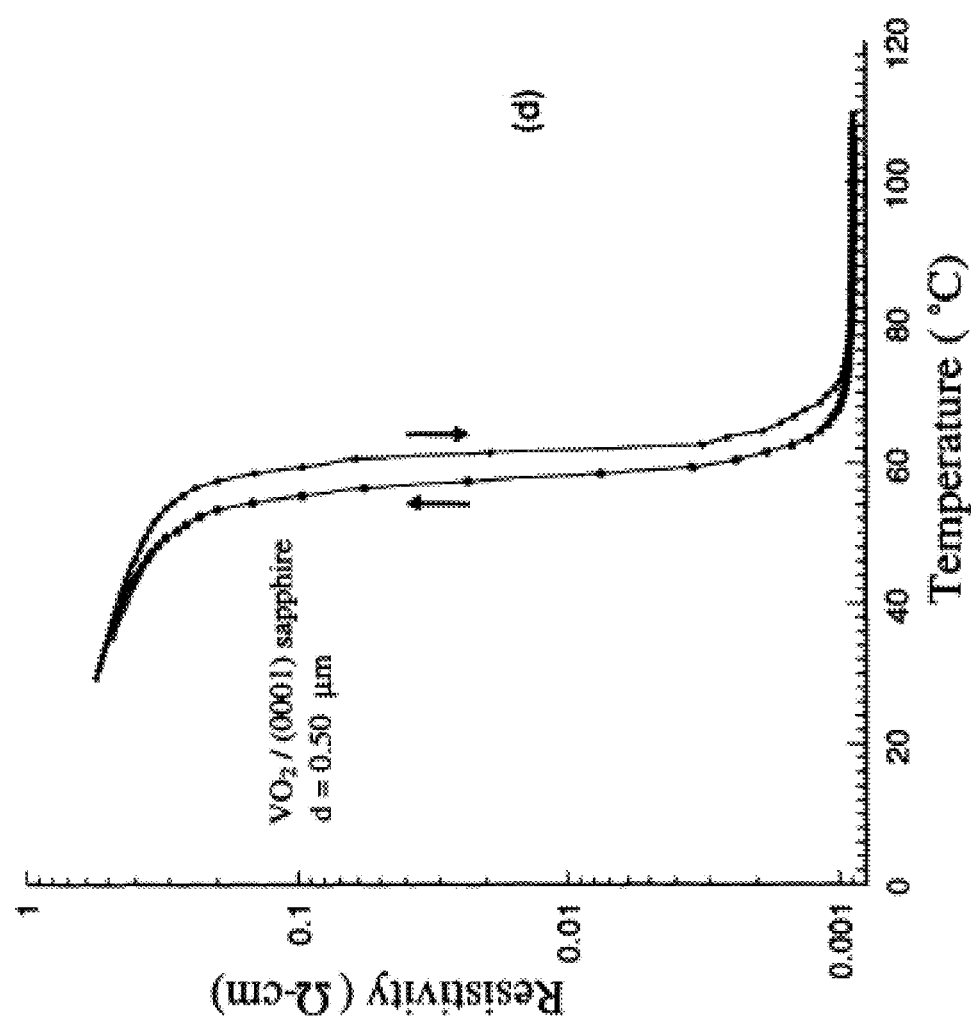
FIG. 2 is a graph illustrating the variation in electrical resistivity of vanadium oxide ($VO_2$) film with respect to a given temperature.

One or more embodiments of the invention address the above-described shortcomings of the prior art by providing a bolometer pixel including a thermal-sensitive film trigger. The thermal-sensitive film trigger is formed from a resistive varying thermal-sensitive material (also referred to as an insulator-to-conductor transition material) such as, for example, vanadium oxide ($V_xO_x$, or e.g., $VO_2$). When heated above a temperature threshold, the resistance of the thermal-sensitive material changes significantly. The resistance of vanadium oxide, for example, decreases as its temperature increases (see FIG. 2). Accordingly, as the temperature of vanadium oxide approaches a temperature threshold (e.g., about 67 degrees Celsius), its resistivity is reduced from approximately 1.0 ohms-centimeter ($\Omega$-cm) to approximately 0.001 $\Omega$-cm, thereby allowing for increased current flow therethrough.

In one or more embodiments, the varying resistance of the thermal-sensitive film trigger is utilized together with a trigger sense circuit capable of detecting one or more overheated bolometer pixels included in a thermal imaging system. In response to detecting one or more overheated pixels, the trigger sense circuit can output a protection control signal that invokes a thermal protection operation and/or initiates a thermal mitigation device such as, for example, a mechanical shutter or voltage-controlled window in front of the bolometer array that blocks the thermal energy source from delivering damaging radiation to the affected pixels. In addition, the location of the overheated thermal-sensitive film trigger(s) among a bolometer pixel array can be identified, and in turn the thermal imaging system can determine the direction(s) and general location(s) of the thermal heat source(s).

Turning now to FIG. 1, a bolometer pixel including a thermal-sensitive film trigger 100 (hereinafter referred to as a bolometer pixel trigger 100) is illustrated according to a non-limiting embodiment. The bolometer pixel trigger 100 includes a substrate 101 that supports a bolometer 102 by opposing electrically conductive contact beams 104a and 104b. In one or more embodiments, an electrical signal can flow through the serpentine thermal regulator elements 105 after passing through contacts 104a & 104b. Upon reaching the opposite side of the bolometer, the signal is routed to the substrate through a second set of contacts.

The bolometer 102 includes a photosensitive region 106 (sometimes referred to as a mesa), which is interposed between the contact beams 104a and 104b. In some embodiments, the bolometer 102 can include one or more thermal regulator elements 105, which regulate heat transfer between the photosensitive region 106 and the substrate 101 instead of allowing heat applied to the substrate 101 to immediately travel to the bolometer 102.

The photosensitive resistive region 106 is formed from a thermoelectric conversion material (e.g. amorphous silicon) having a thermal resistance coefficient value. The thermal resistance coefficient value provides a bolometer thermal resistance, which can be utilized to sense thermal energy delivered to the bolometer pixel trigger 100. For example, when thermal energy (e.g., infrared light) is delivered to the photosensitive resistive region 106, the resistance of the thermoelectric conversion material decreases. The change in thermal resistance is converted into a voltage, which can be read out and utilized to provide a thermal sensor.

The bolometer pixel trigger 100 further includes a thermal-sensitive film trigger 108 that is coupled to the substrate 101 by a trigger thermal regulator 110. The trigger thermal regulator 110 regulates heat transfer between the thermal-sensitive film trigger 108 and the substrate 101 instead of allowing heat applied to the substrate 101 to immediately travel to the thermal-sensitive film trigger 108.

The thermal-sensitive film trigger 108 is formed from a resistive varying thermal-sensitive material 112 (also referred to as an insulator-to-conductor transition material), which allows it to operate as a thermal-sensitive switching device. In one or more non-limiting embodiments, the resistive varying thermal-sensitive material 112 includes vanadium oxide ($V_xO_x$, or e.g., $VO_2$). When heated above a temperature threshold (e.g., about 67° C.), $VO_2$ undergoes a phase change such that its resistance decreases. Accordingly as the temperature of $VO_2$ increases beyond its temperature threshold, its resistivity is reduced to approximately 0.001 $\Omega$-cm, thereby allowing for increased current to flow therethrough. Although the thermal-sensitive material 112 is described herein in terms of $VO_x$, it should be appreciated that the thermal-sensitive film trigger 108 can be formed from other types of resistive varying thermal-sensitive materials or insulator-to-conductor transition materials including, but not limited to, germanium telluride (GeTe).

The trigger thermal regulators 110 also serve as electrically conductive contacts to facilitate current flow to the film trigger 108, similar to the thermal regulator elements located underneath the bolometer pixel 105. The thermal sensitive film circuit should operate in a similar manner, although the routing configuration of the thermal regulators 110 can be tuned to meet desired design concepts.

In one or more embodiments, a plurality of bolometer pixel triggers 100 can be implemented in a bolometer array (not shown), which is then installed in a thermal imaging system (not shown). In at least one embodiment, a bolometer pixel trigger 100 is utilized for each pixel (i.e., per pixel) included in the bolometer array. Accordingly, excessive thermal energy levels directed at the bolometer array can be detected by any one of the bolometer pixel triggers 100 when its thermal-sensitive film trigger 108 is heated above the temperature threshold. In other embodiments, a sparse number of bolometer pixel triggers 100 can be dispersed among a plurality of conventional bolometers pixels thereby increasing the total bolometer fill factor of the array.

Turning now to FIG. 3, a trigger sense circuit 300 capable of detecting an excessive thermal energy level is illustrated in a normal state or armed state according to a non-limiting embodiment. The trigger sense circuit 300 includes bolometer pixel triggers 100a, 100b, 100c, 100n, a trigger sense signal line 302, a ground reference signal line 304, a resistance transimpedance amplifier circuit (RTIA) 306, and an electronic comparator 308. Each bolometer pixel trigger 100a, 100b, 100c, 100n includes a trigger terminal that is connected to the trigger sense signal line 302 and a ground terminal that is connected to the ground reference signal line 304. The combination of the RTIA 306 and the electronic comparator 308 provides one example of a pixel trigger overheating condition detector circuit capable of detecting whether one or more of the bolometer pixel triggers 100a, 100b, 100c, 100n has become overheated due to exposure to an excessive amount of thermal energy (e.g., solar radiation, laser energy, etc.).

The bolometer pixel triggers 100a, 100b, 100c, 100n can each include a thermal-sensitive film trigger formed from a resistive varying thermal-sensitive material (e.g., $VO_2$) like that shown in FIG. 1. In FIG. 3, the thermal-sensitive film trigger for each pixel triggers 100a, 100b, 100c, 100n is referenced as "RH", indicating that the resistance of the thermal-sensitive film trigger is high when operating in a normal state, i.e., when not heated above its phase change temperature threshold (e.g., about 67° C.).

The RTIA 306 includes an operational amplifier (OpAmp) 310, a feedback resistor ($R_{TIA}$) 312, and a current source 314. A first input terminal 316 (e.g., positive terminal) of the OpAmp 310 is connected to a bias voltage ($V_{bias}$) (e.g., 1 V), while a second input terminal 318 (e.g., negative terminal) is connected to the trigger sense signal line 302. A first end of the feedback resistor 312 is connected to the second input terminal 318 (e.g., negative terminal) of the OpAmp 310, while the opposing second end is connected to the output 320 of the OpAmp 310. The input of the current source 314 is connected in common with the second end of the feedback resistor 312 and the output 320 of the OpAmp 310, while the output of the current source 314 is connected in common with the first end of the feedback resistor 312 and the second input terminal 318 of the OpAmp 310.

The current source 314 generates a direct-current (DC)-source trim current ($I_{trim}$) to source the "untriggered" bias current to the bolometers. Because none of the bolometer pixel triggers 100a, 100b, 100c, 100n are overheated, they are all operating in an "untriggered" state such that approximately an equal amount of current flows through each pixel trigger 100a, 100b, 100c, 100n. The amount of current ($I_{LRH}$) flowing through a given untriggered pixel 100a, 100b, 100c, 100n can be calculated as: $I_{LRH}=V_{bias}/R_H$.

The difference in total current through the bolometers in a trigger group and the trim current ($I_{trim}$) induces an initial voltage (e.g., 0V) across $R_{TIA}$ 312, which is applied to the second input terminal 318 of the OpAmp 310. Accordingly, the OpAmp output 320 generates a first RTIA output voltage (e.g., 1V). In this manner, the RTIA 306 serves as a current monitor by converting the current level ($I_{trim}$) of the initial current into an output voltage signal.

The comparator 308 includes a first input terminal 322 (e.g., a reference voltage terminal 322) and a second input terminal 324 (e.g., a RTIA voltage terminal 324). The reference voltage terminal 322 is connected to a voltage source to receive a reference voltage (e.g., 2V). The RTIA voltage terminal 324 is connected to the OpAmp output 320 to receive the RTIA output voltage. When the trigger sense circuit 300 is operating in the normal armed state as shown in FIG. 3, the RTIA output voltage (e.g., 1V) applied to the RTIA voltage terminal 324 is less than the reference voltage (e.g., 2V) applied to the reference voltage terminal 322. Accordingly, the comparator 308 outputs a protection control signal 326 having a first voltage level (e.g., 0V).

Turning now to FIG. 4, the trigger sense circuit 300 is shown operating in a triggered state according to a non-limiting embodiment. More specifically, bolometer pixel trigger 100c receives an excessive amount of thermal energy such that the resistance of its thermal-sensitive film trigger $R_L$ changes. When utilizing $VO_2$ for the thermal-sensitive film trigger $R_L$, for example, the resistance of the thermal-sensitive film trigger $R_L$ decreases as its temperature increases. Accordingly, as the temperature of the $VO_2$ thermal-sensitive film trigger $R_L$ exceeds its phase change temperature threshold (e.g., about 67° C.), its resistivity is reduced to approximately 0.001 Ω-cm, thereby tripping the bolometer pixel trigger 100c and increasing current flow therethrough. As a result, the overall resistance of the trigger sense circuit 300 is reduced. In FIG. 4, the tripped bolometer pixel trigger 100c having the overheated thermal-sensitive film trigger is referenced as "$R_L$", indicating that the resistance of the overheated thermal-sensitive film trigger is reduced allowing an increased level of current to flow therethrough.

In the triggered state shown in FIG. 4, the difference between the sum of the currents and the fixed current level ($I_{trim}$) increases due to the reduced resistance of the overheated thermal-sensitive film trigger $R_L$ of bolometer pixel trigger 100c. The amount of current ($I_{LRH}$) flowing through the overheated bolometer pixel trigger can be calculated as: $I_{LRL}=V_{bias}/R_L$. The increased current also changes the voltage (e.g., 2V) across $R_{TIA}$ 312, which is applied to the second input terminal 318 of the OpAmp 310. Accordingly, the OpAmp output 320 generates a second RTIA output voltage (e.g., 3V). In this manner, the RTIA 306 indicates a change in the current level based on the changed output voltage signal (e.g., 3V).

In the triggered state, the second RTIA output voltage (e.g., 3V) applied to the RTIA voltage terminal 324 of the comparator 324 is now greater than the reference voltage (e.g., 2V) applied to the reference voltage terminal 322. Accordingly, the comparator 308 outputs a protection control signal 326 having a second voltage level (e.g., 1V). A separate controller (not shown) can receive the protection control signal 326, and in response to detecting the second voltage level (e.g. 1V) can output another protection control signal that invokes a protection operation to protect the overheated bolometer pixel trigger 100c. The protection operation can include, but is not limited to, initiating a fast-acting mechanical shutter or a variable transmission window mounted in front of the bolometer array to block the excessive energy delivered to the over-heated pixel(s).

Figure 5:
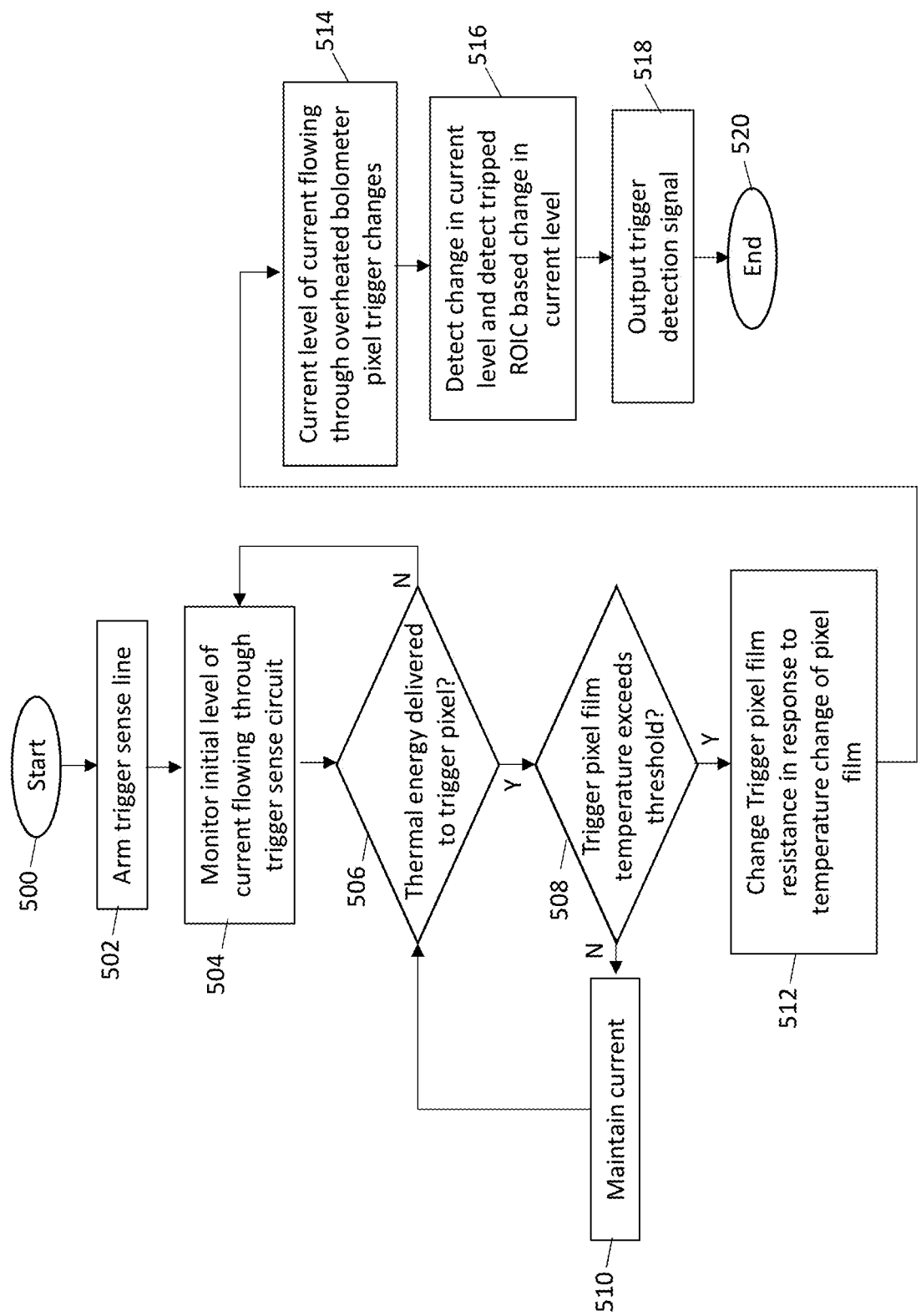
FIG. 5 is a flow diagram illustrating a method of detecting thermal energy delivered to a bolometer pixel trigger according to a non-limiting embodiment.

Turning now to FIG. 5, a method of detecting thermal energy delivered to a bolometer pixel including a thermal-sensitive film trigger is illustrated according to a non-limiting embodiment. Referring also to FIGS. 1, 3 and 4, the method begins at operation 500, and at operation 502 the trigger sense circuit 300 is armed and operating at in a normal state by delivering a DC-sourced trigger current ($I_{trim}$) to a plurality of bolometer pixel triggers s 100a, 100b, 100c, 100n having a temperature that is less than the temperature threshold of their respective thermal-sensitive film triggers 108. At operation 504, the current level of the initial current is monitored, and a determination is made as to whether thermal energy is delivered to one or more of the bolometer pixel triggers 100a, 100b, 100c, 100n at operation 506. When no thermal energy is received by the pixel triggers 100a, 100b, 100c, 100n, the method returns to operation 504 and continues monitoring the current level generated by the current source 314.

When, however, thermal energy is received by one or more of the pixel triggers 100a, 100b, 100c, 100n, the trigger sense circuit 300 determines whether the received thermal energy causes the thermal-sensitive film trigger 108 of one or more bolometer pixel triggers 100a, 100b, 100c, 100n to exceed its phase change temperature threshold at operation 508. When the temperature does not exceed the temperature phase change threshold, the resistance of the thermal-sensitive film triggers 108 remains effectively unchanged so that the current level is effectively maintained at the initial current level ($I_{trim}$) at operation 510, and the method returns to operation 506 to continue monitoring the delivery of thermal energy.

When, however, the temperature of one or more thermal-sensitive film triggers 108 exceeds the phase change temperature threshold at operation 508, the resistance of the overheated thermal-sensitive film trigger 108 changes (e.g., decreases from $R_H$ to $R_L$) at operation 512. At operation 514, the current level of the current flowing through one or more bolometer pixel triggers (e.g., pixel trigger 100c) changes due to the lowered resistance of the overheated bolometer pixel trigger 100c. At operation 516, the change in current level invokes the triggered state of the trigger sense circuit 300. In response to invoking the triggered state of the trigger sense circuit 300, a trigger output signal 326 can be output, i.e., the voltage of the output signal 326 is changed from a first voltage level indicating operation in the normal state to a second voltage level indicating operation in the triggered state, at operation 518, and the method ends at operation 520.

Figure 6:
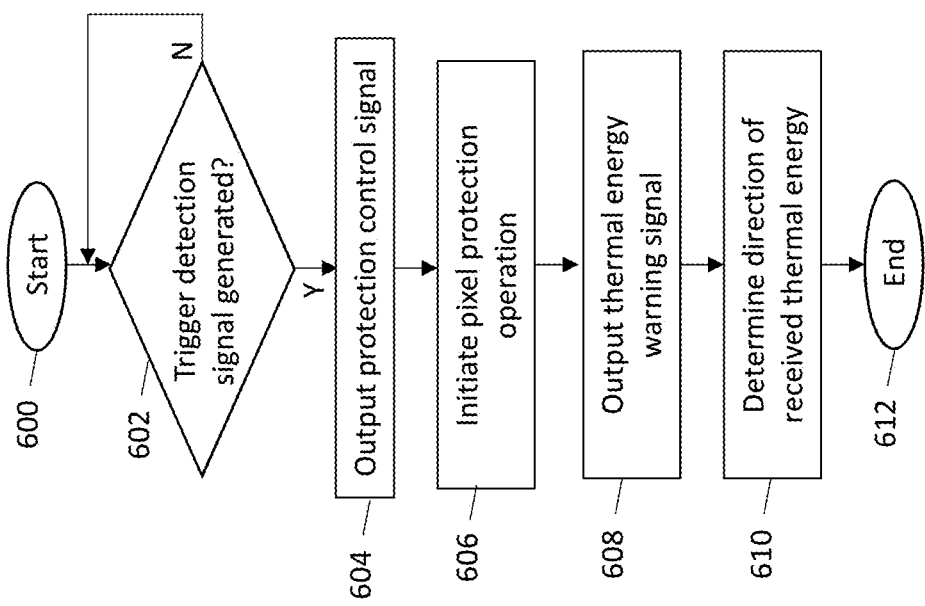
FIG. 6 is a flow diagram illustrating a method of protecting bolometer pixels in a thermal imaging system according to a non-limiting embodiment.

Turning now to FIG. 6, a method illustrates that a trigger detection signal 326 output by the trigger sense circuit 300 can be utilized to perform a protection operation to protect overheated bolometer pixels 100c in a thermal imaging system. The method begins at operation 600, and at operation 602 a determination is made as to whether the trigger sense circuit 300 outputs a trigger detection signal 326 with a second voltage level indicating that a thermal-sensitive film trigger 108 of one or more bolometer pixel triggers 100a, 100b, 100c, 100n is heated beyond its phase change temperature threshold. When the trigger detection signal 326 is not output from the trigger sense circuit 300 at the second voltage level but is instead at the first voltage level indicating a normal state, the method returns to operation 602 and continues monitoring for the trigger detection signal.

When, however, the trigger detection signal 326 with the second voltage level is detected, a separate controller (not shown) outputs a protection control signal at operation 604, and a protection operation is initiated at operation 606 to protect the bolometer pixels in the thermal imaging system. The protection operation can include, but is not limited to, initiating a mechanical shutter or a variable transmission window in front of the bolometer array to block the excessive energy delivered to the over-heated bolometer pixel trigger(s). At operation 608, an excessive thermal warning signal can be output (e.g., via an imaging system controller), and the direction and/or location of the thermal energy source can be determined (via the imaging system controller) at operation 610 before the method ends at operation 612.

Various embodiments described herein provides a bolometer pixel including a thermal-sensitive film trigger, which is formed from a resistive varying thermal-sensitive material. When heated above a temperature threshold, the resistance of the thermal-sensitive material changes (e.g., decreases) thereby varying (e.g., increasing) the current flow therethrough.

In one or more embodiments, the varying resistance of the thermal-sensitive film trigger is utilized together with a trigger sense circuit capable of detecting one or more overheated bolometer pixels. In response to detecting one or more overheated pixels, the trigger sense circuit can output a protection control signal that invokes a thermal protection operation and/or initiates a thermal mitigation device such as, for example, a shutter or voltage-controlled window, that blocks the thermal energy source from delivered damaging radiation to the affected pixels.

The description of the present invention has been presented for the purpose of illustration. This description is not intended to be exhaustive or to limit the invention to the forms disclosed. Many modifications and variations will be apparent to those of ordinary skill in the art without departing from the scope and spirit of the invention. The embodiments of the invention discussed herein were chosen and described in order to best explain the principles of the invention and the practical applications, and to enable others of ordinary skill in the art to understand the invention. While certain embodiments of the invention have been described, it will be understood that those skilled in the art, both now and in the future, may make various improvements and enhancements that fall within the scope of the claims that follow.

What is claimed is:

1. A bolometer pixel trigger comprising:
   a substrate;
   a bolometer formed on the substrate; and
   a thermal-sensitive film trigger including a resistive varying thermal-sensitive material configured to change resistance in response to a change in temperature thereof;
   a resistance transimpedance amplifier (RTIA) circuit configured to generate an output signal having a voltage indicative of the level of the current; and
   a comparator configured to receive a reference voltage and the output signal generated by the RTIA, and configured to detect the at least one overheated bolometer trigger pixel based on a comparison between the voltage of the output signal and the reference voltage,
   wherein the thermal-sensitive film trigger is configured such that current flow therethrough varies in response to changes in the resistance of the resistive varying thermal-sensitive material.

2. The bolometer pixel trigger of claim 1, wherein the resistive varying thermal-sensitive material includes an insulator-to-conductor transition material.

3. The bolometer pixel trigger of claim 2, wherein the insulator-to-conductor transition material includes vanadium oxide.

4. The bolometer pixel trigger of claim 2, wherein the insulator-to-conductor transition material includes germanium telluride.

5. The bolometer pixel trigger of claim 2, wherein the resistance of the resistive varying thermal-sensitive material changes such that current flow through the thermal-sensitive film trigger increases.

6. A trigger sense circuit comprising:
   a current source configured to generate a trim current;
   a plurality of bolometer pixel triggers, each bolometer pixel trigger including a film thermal-sensitive film trigger configured to selectively operate in a normal state and a triggered state based on a temperature of the thermal-sensitive film trigger such that flow of the current therethrough varies;

an overheating condition detector circuit in signal communication with the plurality of bolometer pixel triggers, the overheating condition detector circuit configured to detect at least one overheated bolometer pixel trigger among the plurality of bolometer pixel triggers in response a level of the current;

a resistance transimpedance amplifier (RTIA) circuit configured to generate an output signal having a voltage indicative of the level of the current; and a comparator configured to receive a reference voltage and the output signal generated by the RTIA, and configured to detect the at least one overheated bolometer trigger pixel based on a comparison between the voltage of the output signal and the reference voltage.

7. The trigger sense circuit of claim 6, wherein the trigger sense circuit outputs a trigger detection signal that initiates a protection operation to protect the at least one overheated bolometer pixel trigger in response to detecting the at least one overheated bolometer pixel trigger.

8. The trigger sense circuit of claim 6, wherein the protection operation reduces the temperature of the at least one overheated bolometer pixel trigger.

9. The trigger sense circuit of claim 8, wherein the thermal-sensitive film trigger of each bolometer pixel trigger among the plurality of bolometer pixel triggers comprises a resistive varying thermal-sensitive material configured to change in resistivity in response to a change in temperature thereof.

10. The trigger sense circuit of claim 9, wherein current flow through the thermal-sensitive film trigger varies in response to changes in the resistance.

11. The trigger sense circuit of claim 10, wherein the resistive varying thermal-sensitive material includes an insulator-to-conductor transition material.

12. The trigger sense circuit of claim 11, wherein the insulator-to-conductor transition material includes vanadium oxide.

13. The trigger sense circuit of claim 12, wherein the insulator-to-conductor transition material includes germanium telluride.

14. The trigger sense circuit of claim 13, wherein the resistance of the resistive varying thermal-sensitive material changes such that current flow through the thermal-sensitive film trigger increases.

15. A method of detecting at least one overheated bolometer pixel trigger among a plurality of bolometer pixel triggers, the method comprising:

delivering electrical current having a first current level to a plurality of bolometer pixel triggers, each bolometer including a thermal-sensitive film trigger through which the electrical current flows;

flowing the electrical current at a second current level through at least one of the bolometer pixel triggers in response to an increase in temperature of the at least one thermal-sensitive film trigger of at least one of the bolometer pixel triggers; and detecting at least one overheated bolometer pixel trigger among the plurality of bolometer pixel triggers in response to detecting delivery of the second current level;

generating, via a resistance transimpedance amplifier (RTIA) circuit, an output signal having a voltage indicative of the level of the current;

receiving, via a comparator, a reference voltage and the output signal generated by the RTIA; and detecting the at least one overheated bolometer trigger pixel based on a comparison between the voltage of the output signal and the reference voltage.

16. The method of claim 15, wherein delivering the electrical current at a second current level comprises altering the resistance of the thermal-sensitive film trigger when that the operating temperature of the thermal-sensitive film trigger exceeds a phase-change temperature threshold resulting in the electrical current flowing through the thermal-sensitive film trigger at the second current level.

17. The method of claim 16, wherein detecting at least one overheated bolometer pixel trigger comprises:

generating an output signal having a voltage indicative of a voltage level;

comparing the voltage level to a reference voltage; and detecting the at least one overheated bolometer pixel trigger in response to the voltage level exceeding the reference voltage.

* * * * *